(12) United States Patent
Messenger et al.

(10) Patent No.: US 9,940,602 B1
(45) Date of Patent: Apr. 10, 2018

(54) ITEM PURCHASE, REDEMPTION AND DELIVERY INCLUDING USER-DEFINED PARAMETERS

(71) Applicant: Amazon Technologies, Inc., Reno, NV (US)

(72) Inventors: Michael David Messenger, Seattle, WA (US); Vishal Shantilal Mamania, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 173 days.

(21) Appl. No.: 14/220,859

(22) Filed: Mar. 20, 2014

(51) Int. Cl.
*G06Q 10/08* (2012.01)
*G06Q 10/00* (2012.01)

(52) U.S. Cl.
CPC .................. *G06Q 10/087* (2013.01)

(58) Field of Classification Search
CPC .... G06Q 10/087; G06Q 20/203; G06Q 10/08; G06Q 10/0875; G06Q 10/06
USPC ......................................................... 705/28
See application file for complete search history.

(56) References Cited

U.S. PATENT DOCUMENTS

| 1,250,706 | A | 12/1917 | Suyehiro |
| 6,263,352 | B1 | 7/2001 | Cohen |
| 2001/0021915 | A1* | 9/2001 | Cohen .................. G06O 30/02 705/14.35 |
| 2002/0130065 | A1 | 9/2002 | Bloom et al. |
| 2005/0080727 | A1 | 4/2005 | Postrel |
| 2005/0171862 | A1 | 8/2005 | Duncan |
| 2006/0036504 | A1 | 2/2006 | Allocca et al. |
| 2008/0301009 | A1* | 12/2008 | Plaster ................. G06Q 10/087 705/28 |
| 2012/0173450 | A1 | 7/2012 | McCall et al. |
| 2013/0073371 | A1* | 3/2013 | Bosworth .............. G06Q 30/02 705/14.35 |
| 2013/0226736 | A1 | 8/2013 | Hogg et al. |
| 2013/0290127 | A1 | 10/2013 | Finseth et al. |
| 2014/0279187 | A1* | 9/2014 | Gopinath ............... G06Q 50/01 705/26.7 |

OTHER PUBLICATIONS

U.S. Appl. No. 14/220,891, filed Mar. 20, 2014, Titled: Automated Giveaway Support Platform and Methods.

* cited by examiner

*Primary Examiner* — Garcia Ade
(74) *Attorney, Agent, or Firm* — Kilpatrick Townsend & Stockton LLP

(57) ABSTRACT

Systems and methods including techniques for allowing users of an electronic marketplace to create "Giveaways" on the electronic marketplace are described. For example, a user ("host") can purchase a certain number of items using the electronic marketplace, and set parameters for others to redeem or claim those items. The electronic marketplace charges the host for the items and other estimated costs, reserves the requested number of items, and sets up a redemption site through which other individuals can claim the items according to the parameter(s) set by the host. The electronic marketplace may validate winners of the giveaways by confirming user identities, addresses, etc., using their own user database. When items are claimed, actual costs, such as shipping, taxes, etc., may be calculated, and the electronic marketplace can send a refund to the host for any overcharges, as well as any unclaimed items.

15 Claims, 9 Drawing Sheets

ITEM PURCHASE, REDEMPTION AND DELIVERY INCLUDING USER-DEFINED PARAMETERS

BACKGROUND

Historically, the logistics of running a giveaway were complicated and administratively burdensome. For example, giveaway hosts needed to, among other things, acquire prizes, select winners, collect shipping addresses, fulfill prizes, meet regulatory requirements, and much more. Additionally, in order to generate interest and any significant participant behavior, beyond a narrow localized market, the platforms for such giveaways were usually dependent on mass communication, which presented their own cost challenges and other entry barriers.

BRIEF DESCRIPTION OF THE DRAWINGS

Various embodiments in accordance with the present disclosure will be described with reference to the drawings, in which.

DETAILED DESCRIPTION

Figure 1:
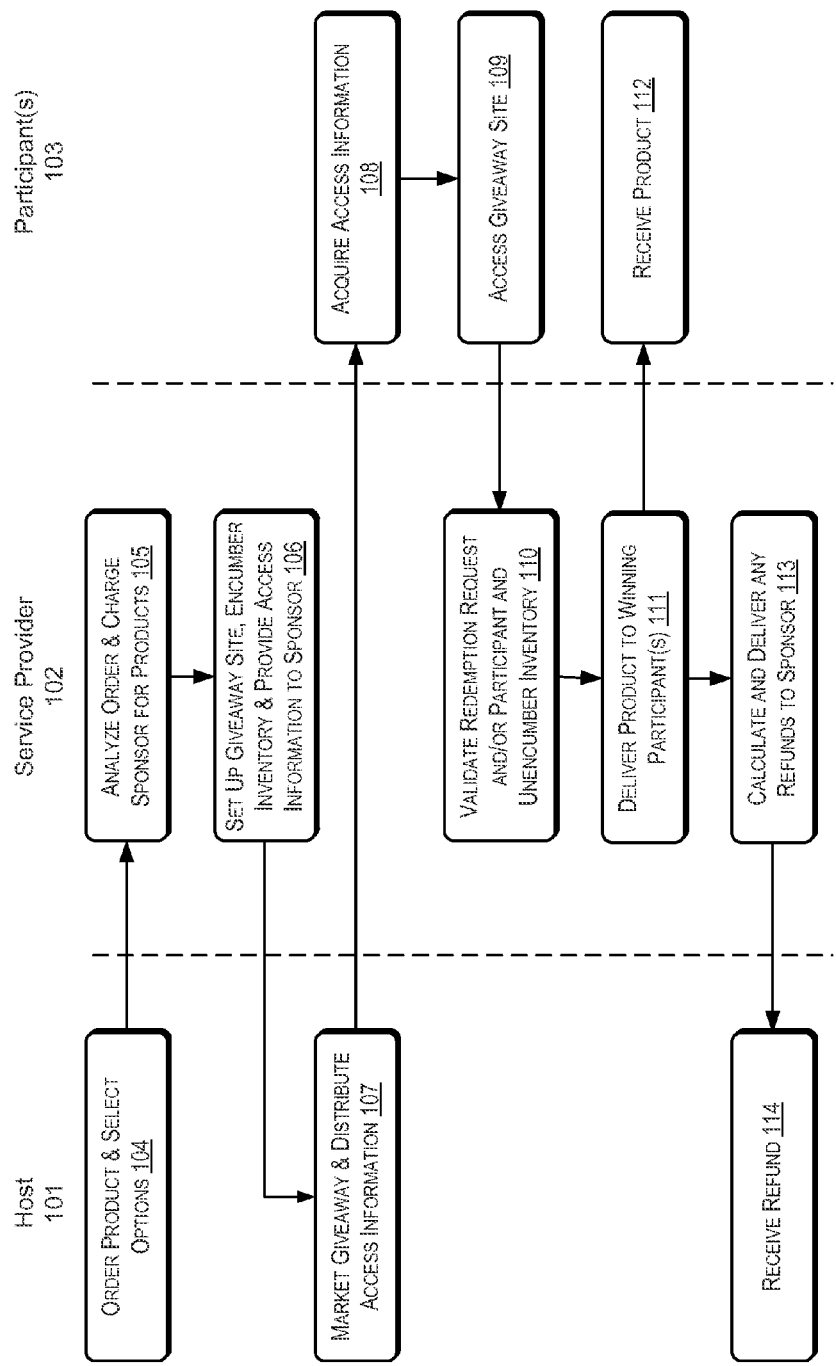
FIG. 1 illustrates an example high-level flow for describing techniques for creating and implementing automated giveaway programs as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some embodiments of the present disclosure are directed to, among other things, providing techniques for allowing users of an electronic marketplace to create "Giveaways" on the electronic marketplace. For example, a user ("host") can purchase a certain number of items using the electronic marketplace, and set parameters for others to redeem or claim those items. The electronic marketplace charges the host for the items and other estimated costs, reserves the requested number of items, and sets up a redemption site through which other individuals can claim the items according to the parameter(s) set by the host. The electronic marketplace may validate winners of the giveaways by confirming user identities, addresses, etc., using their own user database. When items are claimed, actual costs, such as shipping, taxes, etc., may be calculated, and the electronic marketplace can send a refund to the host for any overcharges, as well as any unclaimed items.

In some examples, the electronic marketplace may be managed by one or more service provider computers (e.g., servers) that host electronic content in the form of an electronic catalog. Users may access the electronic catalog to view, review, discuss, order and/or purchase items (e.g., physical items that may be stored in a warehouse or other location, downloadable software or other data, streaming content, services, etc.) from the electronic marketplace.

In some examples, a computer-implemented method may include one or more of receiving an order from a first user (sometimes referred to as a "host") for an item offered by an electronic marketplace, receiving a redemption parameter and a shipping parameter for the item from the first user, calculating an estimated shipping cost for the item based at least in part on the shipping parameter, and/or charging the first user for the item based at least in part on the estimated shipping cost. As used herein, an "item" should be broadly construed to include, for example, a physical good, software or other electronic data, streaming content, a gift card, a membership and/or a service, etc.

In some examples, the first user may further identify a substitute for the item. For example, in cases where the item is a physical good, the first user may select to provide a gift card as a substitute for the physical good, which may be substituted for the item when the item is not available, or in other situations where delivery of the item is impractical.

Some examples may include providing redemption information for the item to the first user, and/or receiving a redemption request from a second user (sometimes referred to as a "participant') for the item. In some examples, the redemption request may include indicia of the redemption information.

Some examples may include validating the identity of the second user and/or validating a redemption request. In some examples, validating the redemption request may be based, at least in part, on a validation of the identity of the second user and/or a redemption parameter. In some examples, validating the second user may be based, at least in part, on user profile information maintained by a provider of the electronic marketplace.

In some examples, a determination may be made regarding whether the item is available for delivery to the second user. This may be based on, for example, whether the service provider, or other designated third party, has sufficient inventory on hand, and/or whether the second user satisfies a shipping or redemption parameter. If an item is not available for delivery to the second user, a further determination may be made regarding whether a substitute for the item is available. The substitute may include, for example, an identical item, which is fulfilled by a different entity than originally selected, or a different item, which is designated by the first user and/or the service provider. In some examples, the second user may be provided with an option to accept the substitute, such as a gift card.

Some examples may include obtaining a shipping address for the second user and/or calculating an actual shipping cost for the item based at least in part on a shipping address for the second user. Some examples may include calculating a refund due to the first user based, at least in part, on a difference between an estimated shipping cost that was charged to the first user and an actual shipping cost.

In some examples, calculating a refund due to the first user may be based, at least in part, on a purchase price of items that are not redeemed by a second user.

Some examples may include providing the item to the second user, without charge to the second user. In some examples, the item may include one or more items that are offered by the first user as promotional giveaways, or other "prizes," that can be redeemed by one or more second users, e.g. on a "first come, first serve" basis, randomly, or according to a schedule such as "every $n^{th}$ participant."

In some examples, shipping parameters, such as those provided by the host or first user, may include a defined geographical area and/or a preferred type of shipping, such as overnight shipping, airmail, standard shipping, etc.

In some examples, a determination may be made regarding whether to ship a claimed item to a second user using a pre-designated preferred shipping type, and a refund due to the first user may be calculated based, at least in part, on cost differences between the preferred shipping type and an actual shipping type used to ship the item to the second user.

Some examples may include calculating an estimated tax based, at least in part, on a redemption parameter and/or the shipping parameter. Some examples may include calculating an actual tax based, at least in part, on the actual shipping address and/or user information associated with the second user. In some examples, calculating the refund due to the first user may be based, at least in part, on a difference between an estimated tax and an actual tax. Some examples may include providing a refund to the first user based, at least in part, on a calculated refund.

In some examples, a system may be provided including a memory that stores computer-executable instructions; and a processor configured to access the memory, the processor configured to access the memory and execute the computer-executable instructions to collectively receive an order from a first user for an item offered by an electronic marketplace; receive a shipping parameter for the item from the first user, the shipping parameter including at least one of a defined geographical area or a preferred type of shipping; calculate an estimated shipping cost for the item based at least in part on the shipping parameter; and/or charge the first user for the item based at least in part on an item cost and the estimated shipping cost.

In some examples, a system may be configured to receive a redemption request from a second user for the item, validate the identity of the second user, and/or validate the redemption request based at least in part on the validation of the identity of the second user.

Some examples may include systems configured to obtain a shipping address for the second user, calculate an actual shipping cost for the item based at least in part on the shipping address for the second user, and calculate a refund due to the first user based at least in part on a difference between the estimated shipping cost and the actual shipping cost.

In some examples, systems may be configured to provide network link information to the first user, the network link information configured for directing the redemption request. In some examples, such network link information may be configured for automated redistribution by the host, e.g. embedded instructions for publication on a social media web page, embedded instructions for distribution via email to a plurality of recipients designated by the host, etc.

In some examples, systems may be configured to receive a redemption parameter from the first user and validate the redemption request based, at least in part, on the redemption parameter. A redemption parameter may include, for example, a start time, an end time, a winning frequency, a defined geographical area, an age, an enrollment requirement and/or a disqualifying feature. In some examples, validating the redemption request may be further based, at least in part, on validating an identity of the second user.

Some examples may include automated reporting of the redemption of the item to a third party, e.g. based on a first threshold and/or other criteria. In some examples, the redemption may be reported to a state or federal tax office, and/or may include information such as a value of the item and an identity of the claimant.

In some examples, a computer-implemented method may include receiving an order from a first user, the order including an item identifier for an item offered by an electronic marketplace and a desired quantity, charging the first user based, at least in part, on a cost of the item and the desired quantity, receiving a redemption parameter from the first user, charging the first user based, at least in part, on a cost of the item and the quantity, providing redemption information for the item to the first user, and/or setting a quantity of items available for redemption based at least in part on the desired quantity. Some examples may include, encumbering (e.g. holding, reserving at a system-wide, or local fulfillment center ("FC"), level, etc.) a number of the items in an inventory of the electronic marketplace based, at least in part, on the desired quantity. In some examples the items may be encumbered after charging the first user for the items.

Some examples may include receiving a redemption request for the item from a second user, and validating the redemption request. Some examples may include unencumbering one of the items from inventory after validating the redemption request, initiating delivery of the one of the items to the second user, and/or reducing the quantity of items available for redemption based at least in part on the validation of the redemption request.

In some examples, replenishment of the inventory for an item may be postponed from the time of purchase by the host until after validation of a corresponding redemption request.

In some examples, the desired quantity, or quantity that the first user is allowed to purchase, may be limited, at least in part, by a number of the items in the inventory of the electronic marketplace.

In some examples, the desired quantity, or quantity that the first user is allowed to purchase, may be further limited, at least in part, by a number of the items expected to be received by the electronic marketplace prior to the items being made available for redemption. For example, the electronic marketplace may allow the user to purchase more items than are presently held in inventory, if a known shipment is expected within an appropriate period of time.

In some examples, the inventory of the electronic marketplace may be maintained, at least partially, in a plurality of fulfillment centers, and a designated fulfillment center may be identified for a validated redemption request. In some examples, delivery of the item from the designated fulfillment center to the second user may be automatically initiated based, at least in part, on the validated redemption request. In some examples, the encumbering of inventory may be performed at a system-wide level (e.g. spanning multiple FCs) and individual items at the FCs may not be encumbered until such time as a redemption request is validated.

In some examples, automated processes and/or systems may be configured to provide a demand forecast associated with an item, the demand forecast based, at least partially, on sales records associated with the item. In some examples, sales based on an order for a giveaway may be considered only after at least one of the redemption requests for the giveaway order is validated. In some examples, the sales based on a giveaway order may be updated in the sales record for the item number after each redemption request for said order is validated.

In some examples, automated processes and/or systems may be configured to reserve one or more paid-for items in an inventory of an electronic marketplace, the paid-for items having been charged to a first user; receive a redemption request for one of the paid-for items from a second user; validate the identity of the second user based at least in part on user profile information that is maintained and/or created by a provider of the electronic marketplace; validate the redemption request based, at least in part, on said validation of the identity of the second user; reduce a quantity of the reserved items based, at least in part, on said validating the redemption request; initiate delivery of one of the items to the second user; and/or report the redemption of the item to a third party based, at least in part, on a first threshold.

In some examples, reporting the redemption of the item to the third party may include reporting a value of the item and/or personal identifying information for the second user (e.g. tax number, SSN, etc.).

In some examples, validating the identity of the second user may include verifying that the second user has a unique identifier, and/or a combination of identifying information, that is different than that included in any other user profile maintained by the provider of the electronic marketplace.

The techniques described above and below may be implemented in a number of ways and in a number of contexts. Several example implementations and contexts are provided with reference to the following figures, as described below in more detail. However, the following implementations and contexts are but a few of many.

FIG. 1 depicts a high-level flow diagram of a first exemplary process for establishing and implementing a giveaway site according to certain embodiments. As shown in FIG. 1, a host 101 may be a user or user of an electronic marketplace provided by service provider 102. For example, service provider 102 may offer a variety of goods, services and other items on one or more websites. The service provider 102 may provide web services, including virtual storefronts for other merchants, and/or may provide their own self-supported web store including, for example, product sales, content rental and/or streaming services, billing, managing their own fulfillment center(s), etc.

The process may begin in 104, where host 101 accesses a web site, widget, or other service, provided by service provider 102 in order to set up a giveaway. This may involve, for example, selecting items to be included in the giveaway, similar to browsing a web store catalogue, and selecting a quantity of the items to be given away. The host 101 may also select options for the giveaway, e.g. redemption parameters and/or shipping options for the prizes, e.g. predefined geographic areas and/or preferred shipping type. In some examples, the sponsor 101 may be given various presentation options for the giveaway site, including different graphics, animations, etc.

The flow may continue with 105, in which the service provider 102 may analyze the order from the host, e.g. to ensure that the order is complete, that there are no legal restrictions against providing the requested item in a designated area, etc. In 105, the service provider may also calculate an amount that must be paid to set up the giveaway. These fees may include, without limitation, the costs for the requested items, estimated shipping charges, estimated taxes, or any other costs that the host is required or chooses to assess. If the host 101 agrees to these charges, the service provider 102 may charge the host 101 for the actual and/or estimated costs in 105 to complete the host's order. This may be accomplished, for example, by charging the host's credit card, or otherwise debiting an account of the host, or by receiving a verified payment from host 101. In some examples, the order may be placed in a hold status until the payment is received in 105.

The flow may continue with 106, in which the service provider 102 may set up the giveaway site for the host 101. The site may be, for example, a web site accessible via the Internet. Various ways of implementing such sites are discussed further below. In one example, each host's giveaway site may receive a unique URL for their own giveaway page on the electronic marketplace.

In 106, the service provider 102 may also encumber inventory corresponding to the paid-for items. For example, if the host 101 orders twenty items for the giveaway, the service provider may encumber, at a system-wide level, twenty of the items so as to ensure that sufficient stock is on hand to immediately provide the items to the winners of the giveaway as they present themselves. However, more complex algorithms are also possible that take into consideration factors such as the winning frequency, expected deliveries of the item to the service provider or other fulfillment center, etc. For example, if the host sets a winning frequency that only allows one item to be claimed per week, and the item is replenished in the service provider's inventory on a regular, or short-turnaround, basis, it may not be necessary to encumber the full quantity of items ordered by the host.

In 106, the service provider 102 may also provide access information for the giveaway site to the host 101. For example, the service provider may provide web address information and/or any necessary security keys for the host to share with participants 103 whereby the participants 103 can access the giveaway site, as discussed further below. Including keys may be advantageous, for example, to ensure that the individuals claiming the items are the intended audience or that they have accessed the desired content prior to attempting to claim the item. Keys may also assist in reducing the effectiveness of certain exploits or other malicious threats to the integrity of the giveaway site.

In some examples, the access information provided by the service provider may include executable instructions that assist the host 101 with advertising the giveaway site. For example, the access information may include embedded code, or links to other resources, that allow the host 101 to automatically post information such as a description of the giveaway and links to the giveaway site to one or more social media sites, and/or to automatically send such information via email, instant messaging, etc., to potential participants, e.g. using a friends list, contacts, or other contact information that the host 101 has access to.

The flow may continue with 107, in which the host 101 markets the giveaway, e.g. by distributing a description of the giveaway and/or the giveaway site access information. In some examples, the giveaway site itself may be configured with content that the host wants to direct traffic to. For example, the giveaway site may provide an opportunity to win an item, such as a book, and also include reviews of the book, and functionality for purchasing the book.

In other examples, the host 101 may include the access information for the giveaway site on another site that they want to drive traffic to. For example, in order to access the giveaway site, a participant may have to access another site of the host 101. In some examples, the access information may be further configurable by the host 101 to best meet their needs, e.g. it can be configured as a widget with adjustable parameters related to timing, accessibility, or other functions.

The flow may continue with 108, in which one or more participants 103 acquire the access information. As mentioned previously, this can take many forms including, for example, clicking links or other executable functions included in an email or other message, clicking on similar items included on a social media or other website, etc.

The flow may continue with 109, in which the participant 103 accesses the giveaway site, e.g. via clicking a link or otherwise using the acquired access information. By way of further example, the access information may include codes, or other keys, that must be input by the participant to access the giveaway site. In some examples, the act of accessing the giveaway site may include, or initiate, a request to redeem or claim an item that is being offered as part of the giveaway.

The flow may continue with 110, in which the service provider 102 validates the redemption request from the participant 103. This may take many forms, some of which are described in further detail below. In some examples, validating the redemption request may include validating an identity of the requesting participant and/or checking any redemption parameters set by the host 101.

If the redemption request is validated, e.g. the requesting participant is validated as a "winner" of the giveaway item, 110 may further include unencumbering one of the items in inventory for delivery to the participant. This may be done, for example, at a system-wide, or local FC, level. However, it should also be noted that, in some examples, it may be unnecessary to encumber or unencumber items in inventory, e.g. with respect to certain digital content that can be distributed to as many individuals who pay the license, etc.

The flow may continue with 111, in which an instance of the item is delivered to the winning participant. Delivery can take many forms, depending on the nature of the giveaway item. For example, goods may be shipped to a participant at a home or other address, software or other digital content may be made available for downloading or streaming to a participant, or a token for certain services may be delivered to the participant via email or other means. In any event, the giveaway item or representation thereof, may be received by the participant 103 in 112.

The flow may continue with 113, in which the service provider 102 may calculate and deliver any refunds due to the host 101. These may include, for example, refunds for differences between estimated shipping and actual shipping costs, between estimated taxes and actual taxes, and/or refunds for unclaimed items (e.g. after a certain period of time).

Refunds in 113 may be processed in similar manner to the payment in 105, and may be credited directly to the host's credit card, credited to a host's account with the service provider 102, or sent to the host 101.

The flow may continue with 114, in which the refund (if any) is received by the host 101. In the event that the giveaway includes multiple items, the flow may reiterate one or more of 109-114 until all of the items have been given away or a pre-designated time has expired. In the event that paid-for items remain after expiration of the giveaway, then 113 and 114 may further include calculating and delivering refunds to the host based on the price of the unclaimed items. In other examples, ownership of unclaimed items may be transferred to host 101 and/or unclaimed items may be delivered to host 101. It should be noted that the disposition of unclaimed items (e.g. refund or transfer to host) may be set in the original order, by the host 101 or by policy of the service provider 102.

Figure 2:
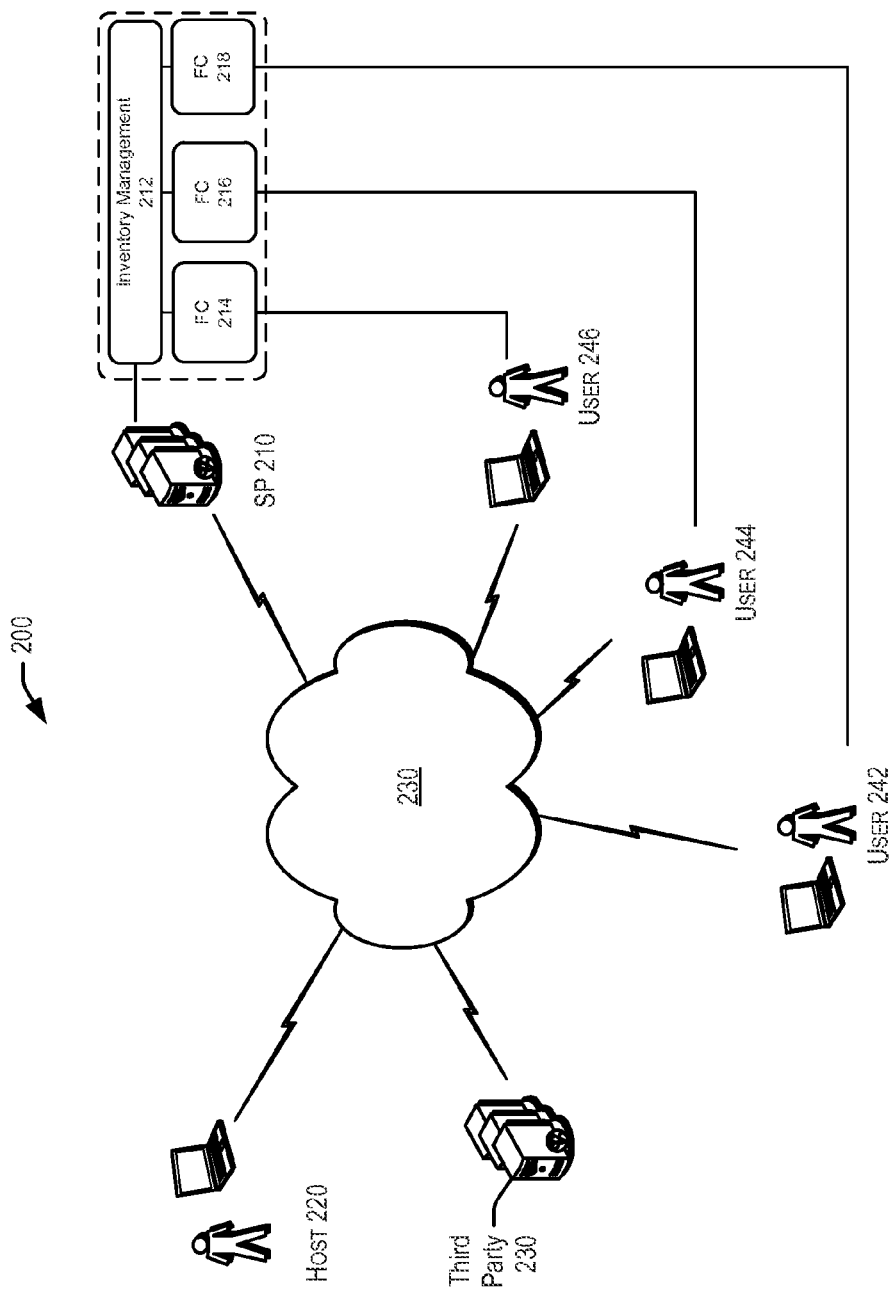
FIG. 2 illustrates an example architecture for implementing order and redemption techniques described herein, according to at least one example.

FIG. 2 depicts an environment 200 in which techniques for the purchase and redemption of items may be implemented. These techniques are described in more detail below in connection with at least FIGS. 3-9.

As shown in FIG. 2, environment 200 may include one or more servers 210 that support web services of a service provider such as described above. For example, the service provider servers 210 may provide a web accessible storefront that offers a variety of products and/or services for users such as host 220 and any number of users 242-246.

Servers 210 may provide or interact with an inventory management layer 212 that may be configured to manage inventory, licenses, replenishment and/or any other function associated with the acquisition, maintenance and/or transfer of items offered for purchase or rent by the service provider. In the example shown in FIG. 2, the inventory management layer 212 interacts with fulfillment centers (FCs) 214, 216, 218, etc., which may include local, preferably short-term, storage of inventory items that are sent from the FCs to purchasers or winning participants.

Servers 210 may be linked to user devices of host 220 and/or users 242, 244, 246 etc., via a wide area network 230, such as the Internet. Servers 210 may also be linked to any number of third party servers 230 via the WAN 230, or other networks such as a VPN, etc. In some examples, third party servers 230 may support social media sites that the service provider can post to or facilitate the host 220 posting to, or the third party servers 230 may support government tax services such as state or federal tax services that collect information including winnings with legal reporting requirements. Any number of other third party services falling within the scope of the overall disclosure may also be represented by servers 230.

As discussed above, a user, such as host 220, may access a web site provided by service provider servers 210, and order items to be included in a giveaway. The service provider servers 210 may charge the host 220 for the actual and estimated costs of the items, with shipping and taxes, and set up a giveaway site, or add such functionality to an already existing site. Afterwards, users 242, 244, 246, etc. may acquire the access information for the giveaway site, and may attempt to redeem (or "win") the paid-for items. In some examples, claimed items may be sent from FCs 214, 216, 218 to users 242, 244, 246.

FIGS. 3-7 illustrate example flow diagrams showing respective processes 300-700 for implementing giveaway sites as described herein. These processes are illustrated as logical flow diagrams, each operation of which may represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

Some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 3:
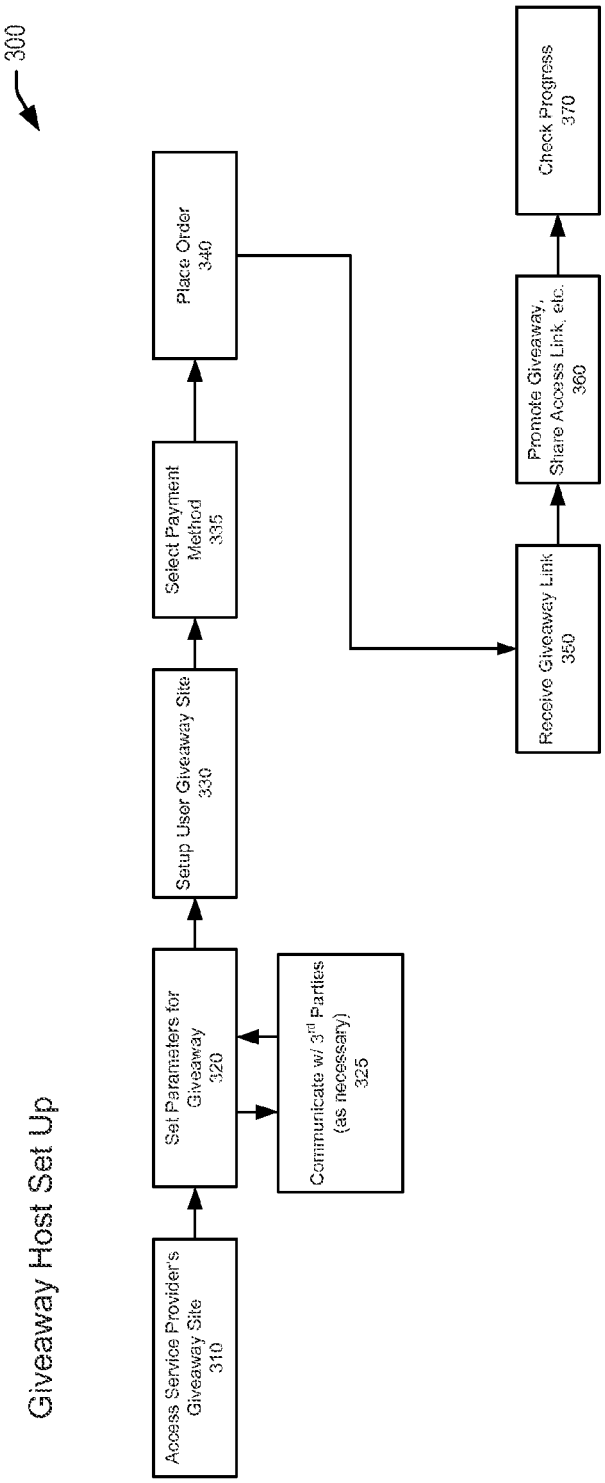
FIG. 3 illustrates an example flow diagram of a process for implementing a giveaway host set up technique described herein, according to at least one example.

FIG. 3 depicts an illustrative flow 300 in which techniques for the purchase and redemption of items may be implemented. In illustrative flow 300, operations may be performed by one or more processors of one or more service provider computers and/or instructions for performing the operations may be stored in one or more memories of the service provider computers.

The flow 300 may begin at 310, in which a user accesses the service provider's site through which giveaway sites are created. This may be, for example, included in a standard purchase page, e.g. as an option, or may be presented as a unique page that is tailored for giveaway site creation. In some examples, access may be conditioned on the user having a verified account with the service provider, so as to allow necessary reporting of giveaways, help reduce fraudulent or other malicious activity, etc.

The flow 300 may continue with 320, in which the user sets parameters for the giveaway site including, for example, an item to be offered, a number of items offered, a fulfillment provider, one or more substitutes, a start time, an end time, a winning frequency, a defined geographical area in which the offer is valid, an age requirement, an enrollment requirement, such as a requirement that claimants enroll with a social media or other service, and/or a disqualifying feature that will preclude a potential claimant from winning.

In some examples, the user may set shipping parameters in 320, such as a geographical area within which the item may be shipped and/or a preferred type of shipping.

Any number of appearance and/or functional preferences for the giveaway site may be set in 320.

The flow 300 may optionally continue with 325, in which the service provider may communicate with various third parties, as needed, e.g. to validate or effectuate parameters set in 320. For example, if the user sets a parameter requiring that potential claimants subscribe to a certain social media feed, the service provider may validate that the identified feed is valid and/or is capable of being subscribed to, in order to ensure that the giveaway site will function properly. The service provider may further communicate with third party fulfillment providers that may be designated by the user as the primary or secondary fulfillment provider. In some examples, such as when the giveaway is dependent on the user, or a third party, acting as the fulfillment service, the service provider may provide a substitute item, e.g. a gift card, an item provided by a fulfillment provider other than the one originally selected, etc.

The flow 300 may continue with 330, in which the service provider takes the necessary steps to set up the user's giveaway site, without enabling it to validate redemption requests. This may be used, for example, as a test site to allow the user to confirm that everything is set up according to their preferences before going live.

The flow 300 may continue with 335, in which the user can select a payment method to pay for the requested items and any estimated costs that may apply. Payment options may include, for example, credit card, online payment services, debiting a user account maintained by the service provider, etc.

The flow 300 may continue with 340, in which the user places the order and is charged according to the selected payment method.

The flow 300 may continue with 350, in which the user receives a link and/or other access information for the giveaway site. This may be provided, for example, by the service provider, or other third party that the service provider uses to support or manage giveaway sites.

The flow 300 may continue with 360, in which the user and/or service provider promote the giveaway, e.g. through social media, messages, advertising, etc. Access links and/or keys may be shared via e-mail or other messages, by accessing web pages of the user or service provider, or other third party services. In some examples, a giveaway site may be implemented as a widget on another page, such as the user's home page to directly influence traffic on that page. In other examples, the giveaway site may operate as a stand-alone page, with or without other functionality included therein.

Sharing access information may include sharing secrets that are difficult for automated systems to interpret, e.g. morphed alpha-numeric codes that are embedded in digitized images, vocalized codes or instructions, etc. When these codes or instructions are interpreted by humans, they may then be manually entered into an appropriate field on the giveaway site, or otherwise acted upon. For example, a vocalized instruction to "circle the blue triangle," or other action, may be easily interpreted and acted upon by a human user, and make it difficult for a bot or other malicious code to hack a giveaway site.

The flow 300 may continue with 370, in which the user may check on the progress of the giveaway from time to time. For example, the user may check simple metrics or data such as the number of prizes claimed or the names and addresses of the winners, or may tap into deeper metrics collected by the service provider, such as demographic data on all users attempting to claim an item and/or demographics of repeat users, the geographic data regarding winners and/or users, the average length of time users spent on the giveaway page, etc.

Figure 4:
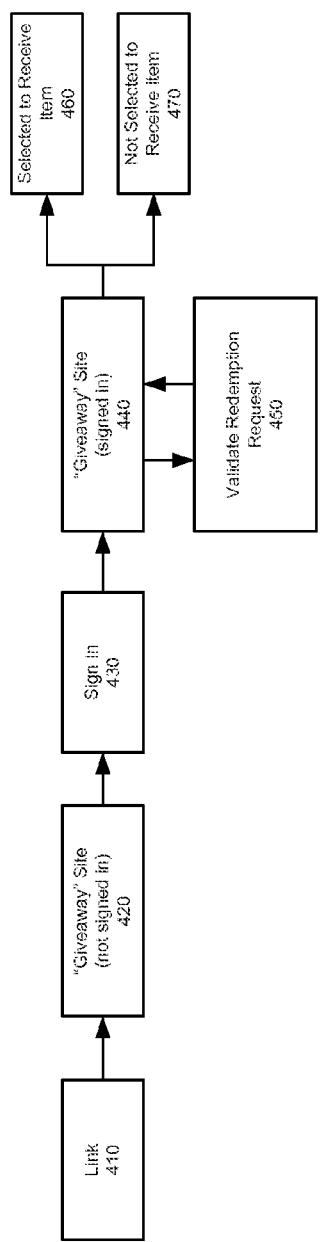
FIG. 4 illustrates another example flow diagram of a process for a participant giveaway entry technique described herein, according to at least one example.

FIG. 4 depicts an illustrative flow 400 in which techniques for the redemption of giveaway items may be implemented. In illustrative flow 400, operations may be performed by one or more processors of one or more service provider computers and/or instructions for performing the operations may be stored in one or more memories of the service provider computers.

The flow 400 may begin at 410, in which a link and/or other access information is provided to a user, such as described above.

The flow 400 may continue with 420, in which the user uses the access information to attempt to access the giveaway site. In this example, the user is initially not "signed in." This may be because the user does not have an account with the service provider, or it may simply be that the user's login has expired. In 420 a first version of the giveaway site may be presented to the user, e.g. with a description of the giveaway or other incentives to encourage the user to create an account and/or sign in, but without the tools necessary to submit a redemption request.

The flow 400 may continue with 430, in which the user is presented with the opportunity to sign in, and have his or her identity recognized by the service provider, or other service supporting the giveaway site. It should be noted that, in the event the user does not have an account with the service provider, 430 may further include the option for the user to establish an account as part of the sign in process.

In some examples, a user account must include a unique identifier (such as an SSN or other number unique to that user), and/or a combination of identifying information, that is different than that included in any other user profile maintained by the service provider. Such restrictions may be advantageous, for example, in reducing the risk of individuals signing up for multiple accounts, and/or in helping with mandatory reporting that may be required in the context of certain giveaway programs.

The flow 400 may continue with 440, in which a second version of the giveaway site may be presented to the signed in user. In some examples, the presentation of the site in 440 may include tools for initiating the submission of a redemption request and/or other tools for a user to satisfy other requirements of the giveaway. One option may be to provide links or other tools for signing up for certain social media feeds or other requirements that the host of the giveaway may want to encourage.

In some examples, a signed-in user may not be eligible to continue past 440 with submitting a redemption request, e.g. if they already submitted a request earlier that day or within a predetermined cycle, or if they already won a prize in the giveaway. Users may also be held at 440, for example, if necessary profile information is not available. For example, a user profile may be missing a piece of information that is necessary to validate a redemption request, like age, address, etc. Rather than allowing the user to submit the request and return an unhelpful "Not Selected" notification, the system may require the user to enter the necessary information in 440 before allowing them to submit a redemption request.

The flow 400 may optionally continue with 450, in which a redemption request from the signed-in user is validated. Validating the redemption request can take many forms and can include, for example, determining if the user meets any criteria of the giveaway, confirming that the user is not disqualified for any reason, and/or applying one or more algorithms with winning criteria embedded therein (e.g. every $5^{th}$ user, the first user every hour, four users picked at random every day, etc.). In some embodiments, the validation may be performed in substantially real time, such that the user can be informed quickly whether they have won or not.

If the redemption request is validated in 450, the flow may proceed with 460 in which the user is notified that they have been selected to receive the item (or a substitute). The user may then be provided with one of the giveaway items or substitutes, as discussed further herein.

If the redemption request is not validated in 450, the flow may proceed with 470 in which the user is notified that they were not selected to receive the item. The user may then be directed to other giveaway sites and/or may be advised when or if they will be eligible to submit another redemption request in the current giveaway.

Figure 5:
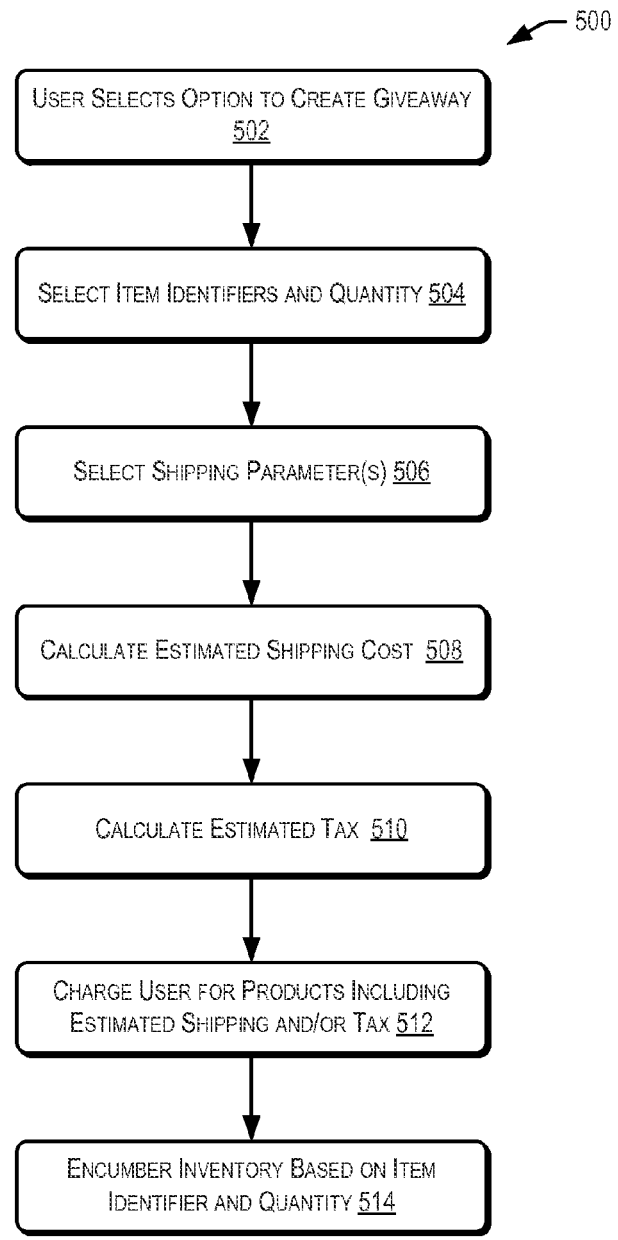
FIG. 5 illustrates another example flow diagram with further details of a process for implementing a giveaway host set up technique described herein, according to at least one example.

FIG. 5 depicts an illustrative flow 500 in which techniques for establishing a giveaway may be implemented. In illustrative flow 500, operations may be performed by one or more processors of one or more service provider computers and/or instructions for performing the operations may be stored in one or more memories of the service provider computers.

The flow 500 may begin at 502, in which the user selects an option to create a giveaway, e.g. on a web store page or other page configured to initiate creation of giveaways or convert a purchase to a giveaway.

The flow 500 may continue with 504, in which the user may select an item (typically identified in an electronic marketplace via a unique item identifier such as a UPC, an ISBN, or vendor-specific numbers). The user may also select a quantity of the items that will be available in the giveaway. In some examples, the user may be allowed to select multiple different types of items to be incorporated in the same giveaway. Each of the different items may further be assigned different redemption parameters, e.g. to randomly determine who wins what prizes, or to match the appropriate prizes with the particular user. Just as one example, in a book giveaway, different books may be given to different winners depending on, for example, an age of the winner, a region in which the user lives, and/or favorites or other user profile information that a service provider has acquired and/or developed. For large-scale sellers the ability to match appropriate gifts to registered users is enormously deep, and may include, for example, recognizing that a user has already purchased a given prize, or that a user strongly disliked a similar product. As such, it is also envisioned that, in certain examples, a host could simply set a price (and/or category other than identifying specific items), and allow the system to select an appropriate prize for a winning user from all or part of the inventory of the electronic marketplace.

In some examples, 504 may also include identifying one or more preferred entities to act as the fulfillment service(s) for the item, and/or identifying one or more substitutes for the item.

The flow 500 may continue with 506, in which the user selects shipping parameters such as a geographical area in which the item may be shipped and/or a preferred type of shipping.

The flow 500 may continue with 508, in which the system calculates an estimated shipping cost for the items. In some examples, this may be estimated to cover a maximum amount that the shipping may cost, e.g. to ensure that the service provider is fully paid up front and does not have to seek further reimbursement from the user if the shipping costs exceed the estimate. Therefore, the estimated shipping cost may be calculated using a maximum distance considering the defined geographical area, any designated fulfillment services, the location of inventory and/or FCs, and/or the preferred shipping type (even if not available in all areas).

The flow 500 may continue with 510, in which an estimated tax is calculated. Again, in some examples, this may be estimated to cover a maximum amount that the taxes may cost, e.g. to ensure that the service provider is fully paid up front and does not have to seek further reimbursement from the user if the taxes exceed the estimate. Therefore, the estimated tax may be calculated using a maximum tax considering the defined geographical area, as well as the relevant state and federal tax laws.

The flow 500 may continue with 512, in which the user may be charged for the full amount of the items plus the estimated shipping cost and/or estimated tax. The charges may be applied, for example, to a credit/debit card, an online payment service and/or an account for the user that is maintained by the service provider.

In some examples, a deposit may be collected from the user based on an estimated tax, rather than the user being specifically charged for the estimated tax, e.g. in order to comply with legal requirements regarding prepayment of estimated taxes.

The flow 500 may continue with 514, in which inventory corresponding to the item number, and quantity of items ordered and charged to the user may be encumbered (e.g. reserved at a system-wide level, or at a FC level). In some examples, this reservation may be made at the system-wide level to allow individual FCs the maximum flexibility in disposing of inventory.

In some examples, such as when the user has designated a fulfillment service other than the service provider, 514 may involve sending appropriate messages to the other fulfillment services to encumber inventory and/or the service provider designating or encumbering substitutes that may be used in the event that the other fulfillment services are unable to honor a redemption request.

It is noted that, in some examples, such as when the user designates a gift card, or other item with an effectively unlimited supply, as the item or as a substitute for the item, it may not be necessary to encumber items in inventory.

Figure 6:
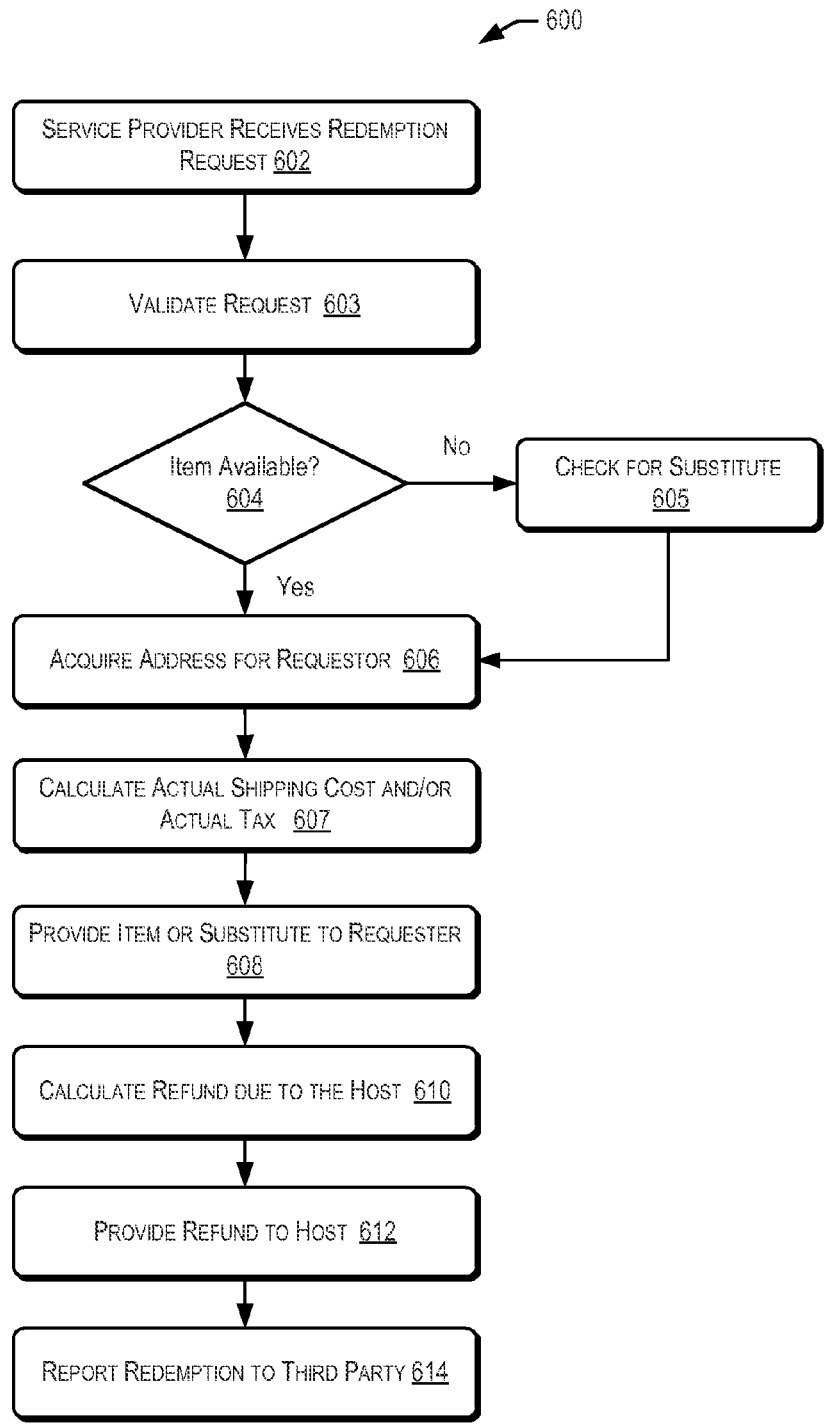
FIG. 6 illustrates another example flow diagram of a process for providing refunds as described herein, according to at least one example.

FIG. 6 depicts an illustrative flow 600 in which further details of an exemplary redemption of items are provided. In illustrative flow 600, operations may be performed by one or more processors of one or more service provider computers and/or instructions for performing the operations may be stored in one or more memories of the service provider computers.

The flow 600 may begin at 602, in which the service provider of a giveaway site receives a request from a user to redeem or claim an item being offered by the giveaway site.

The flow 600 may continue with 603, in which the site service provider validates the redemption request, as discussed further herein.

The flow 600 may continue with 604, in which a determination is made regarding whether the item is available for redemption. This may be based on, for example, whether the service provider, or other fulfillment service, has sufficient inventory on hand.

In the event that the item is not available, the flow 600 may continue with 605, in which a substitute may be identified. For example, the host may have specified certain substitutes, such as a gift card, an equivalent item, or allow the participant to select an equivalent item (e.g. from a predetermined category or list of items). The host may also designate alternative fulfillment services that may be used to satisfy the redemption requests as a substitute. Alternatively, the service provider may scan fulfillment services that participate in the electronic marketplace to see if a comparably priced matching item can be found to satisfy the fulfillment request under the terms of the giveaway, e.g. item cost, estimated shipping cost, etc.

In the event that the item, or a substitute, is available, the flow 600 may continue with 606, in which the site service provider acquires the address for the requesting user. In some examples, this may be a shipping address that the service provider has on file for the requesting user, e.g. in user profile information. In other examples, the service provider may request the address from the requesting user before, or after, validating the redemption request. For example, in situations where the address is determinative of whether the request will be validated (e.g. the offer only applies to certain geographical areas or the shipping is only authorized within a certain geographical area), the service provider may require the address information be provided before attempting to validate the request. However, if the address is not significant, or of the host sets a parameter that allows the flow to proceed without it, the address may be obtained after validating the redemption request.

In some examples, the requesting user may also be given an option to participate in a giveaway for which they are outside of the geographic qualifying or shipping region. For example, the requesting user may be advised that, due to the rules of the giveaway, shipping to their address is not included, but that the requesting user may be allowed to participate if they agree to pay the extra shipping cost. In some examples, the amount of the extra shipping cost may be calculated and provided to the requesting user so that they can make an informed decision as to whether they want to participate.

In some examples, a determination as to whether the item and/or a substitute is available, like in 604 and 605, may be made after the address is acquired in 606. For example, there may be instances where an item is determined to be unavailable based on the address information, even though there is sufficient inventory on a system-wide level, e.g. if the address is outside of shipping limits from FC's having the inventory, if the address is outside of a designated geographic area, if another fulfillment service is not able to deliver the item to the address in a predetermined period of time, etc.

It is also noted that, in some examples, acquiring the address for the requesting user may involve acquiring a network address to which digital content may be delivered, e.g. by streaming, downloading, etc. In some examples, a given item may be deliverable by various means, and the requesting user may designate the type of delivery they want. In such instances, the service provider may acquire different type address information based on the preferred delivery type. For example, if a requesting user chooses to receive a digital download of a game, they may be asked to provide address information to allow the download to proceed, whereas if the requesting user chooses to receive DVD, or other hard-copy, of the game, they may be asked to provide shipping address information for physical delivery.

The flow 600 may continue with 607, in which the site service provider calculates the actual shipping cost and/or the actual tax for an item that has been won by the requesting user. These calculations may be based on, for example, the address information acquired in 606, e.g. to determine actual shipping cost to that address (if shipping is required), and the total tax due for sales in the relevant state. Any other actual costs may be determined in this step as well.

In some examples, the system may determine whether to ship the item to the requesting user using the preferred shipping type set by the host. For example, the requesting user may be in an area where the preferred shipping type is unavailable. In such circumstances the system may determine the actual shipping cost based on the selected shipping type, rather than the preferred shipping type, and may further calculate the refund discussed further below, based in part on differences in cost between the preferred shipping type and the actual shipping type used to ship the item to the requesting user. In other examples, the system may "upgrade" the shipping type, at no cost to the host, if the preferred shipping type is unavailable.

The flow 600 may continue with 608, in which the item is provided by the service provider, or other designated fulfillment service, to the requesting user. Although sometimes discussed in the context of physical shipping, some examples may also include electronic transmission of software, digital media, tokens for services, or other items that do not require physical shipping. In those cases, it may still be beneficial to calculate estimated and actual taxes, even when no shipping is involved.

The flow 600 may continue with 610, in which the service provider calculates a refund that is due to the host of the giveaway. For example, the difference between any estimated shipping and actual shipping, the difference between any estimated tax and actual tax, and/or the cost of any unclaimed items in the giveaway may be totaled to determine a refund amount.

Although examples discussed herein include safeguards for ensuring that the host is charged up front an amount that covers or exceeds the total costs that will be incurred, there are scenarios in which the service provider may end up spending more in satisfying a giveaway than expected. For example, the service provider may make a decision to ship an item from a remote FC in order to make the best use of their inventory on a system-wide basis. If the shipping cost in that situation, or others, exceeds the amount charged to the host, the system may be configured to absorb or "write off" such excess expenses.

The flow 600 may continue with 612, in which a refund (if any) may be provided to the host. This may be done via credit card, online payment service, a user account managed by the service provider or other means known in the art. In some examples, the refunds may be provided on a rolling basis as individual items are claimed, or the refund may be postponed until all items have been redeemed or a time limit for the giveaway expires. Algorithms may also be implemented to allow forecasting of when a refund can be paid with little to no risk of future costs exceeding the original amount charged.

The flow 600 may continue with 614, in which the redemption of one or more items may be reported to a third party, such as a state or federal tax service, a tax representative of the winner(s), and/or a tax representative of the host. In this regard, it should be noted that, in some examples, a requesting user that wins an item may be given the option to provide address information for a tax representative that they desire any mandatory reporting to go to, or they can elect to receive such reporting themselves.

Figure 7:
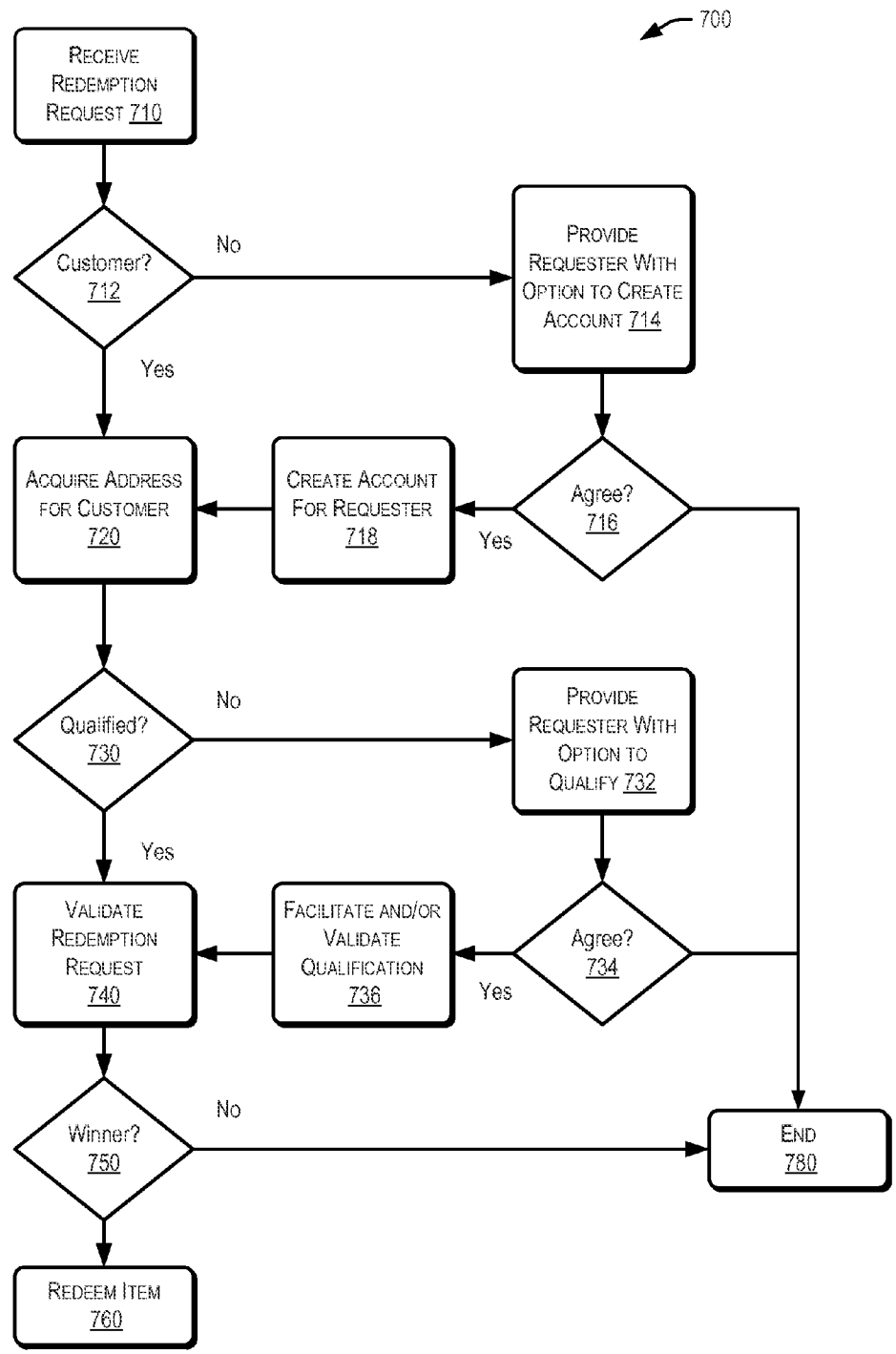
FIG. 7 illustrates another example flow diagram of a process for validating users and redemption requests described herein, according to at least one example.

FIG. 7 depicts an illustrative flow 700 in which further details regarding exemplary user and redemption validation processes are described. In illustrative flow 700, operations may be performed by one or more processors of one or more service provider computers and/or instructions for performing the operations may be stored in one or more memories of the service provider computers.

The flow 700 may begin at 710, in which a redemption request is received from a requesting user, e.g. via a giveaway site or embedded widget.

The flow 700 may continue with 712, in which a determination is made regarding whether the requesting user is a recognized customer. This may be based, for example, on whether the requesting user is signed in under a customer account, whether the requesting user is able to complete a required login process, whether the requesting user affirms that they are not a customer, etc.

If it is determined that the requesting user is not a customer, the flow 700 may continue with 714, in which the requesting user is provided an option to create a customer account, e.g. via redirection to an account sign up page, a splash page, etc.

The flow 700 may continue with 716, in which a determination is made regarding whether the requesting user agrees to become a customer.

If it is determined that the requesting user does not agree to become a customer, the flow may proceed to 780 where the flow ends this instantiation. Ending the flow when the user refuses to become a customer may be necessary in certain examples, such as where the service provider needs to validate the identity of the users making redemption requests and/or when the service provider assumes reporting responsibility under state and/or federal law.

If it is determined that the requesting user agrees to become a customer, the flow may proceed to 718, in which a customer account is created for the user. This may include, for example, the user providing necessary address and/or identification information.

Returning to 712, if it is determined that the requesting user is a known customer, or if the requesting user becomes a known customer in 718, the flow 700 may continue with 720, in which address information for the customer is acquired. Typically, this may be included in the customer profile information such as created in 718. However, in some circumstances, customers may have multiple shipping addresses or may not have provided any address information, in which case the customer may need to provide or confirm the appropriate shipping address, or residence. As noted previously, even when the giveaway item can be electronically delivered, there may still be a need for address information, e.g. to calculate actual taxes, or satisfy a redemption parameter of the host. Although FIG. 7 shows a process in which an address may be obtained before validation of the redemption request (described below in 740), it is also possible for the address to be obtained after validating the redemption request (such as shown in FIG. 6).

The flow 700 may continue with 730, in which a determination may be made regarding whether the validated customer is qualified for the giveaway. This determination may be made, for example, based on shipping restrictions, redemption parameters such as age, or other non-negotiable criteria, in which case the flow may proceed to 780 where the instantiation of the flow ends. However, if the qualification is something that the customer does not currently satisfy, but could rectify, the flow may continue to 732 where the customer is given an option to qualify for the giveaway. For example, if the host requires the customer to subscribe to a designated feed, view or like a certain web page, or other activities that the customer can perform, an option to do so may be presented to the customer.

In some examples, the determination as to whether the customer is qualified may be made by the service provider using social media access rights granted by the customer. For example, a customer can connect a social media account with a giveaway site using automated permission dialogues provided by the social media site and/or the service provider giveaway site. If the customer and/or the host accepts the option to share social media data with the giveaway site, any number of automated checks may be accomplished, e.g. whether a customer "likes" or subscribes to designated social media content, etc. In some examples, the host may be able to link a giveaway to a social media site and/or feed that the host controls permissions to. For example, if the giveaway is linked to a social media site and/or feed of the host, the host can allow the service provider to access relevant information associated with the social media site and/or feed, such as what other users "like" the site or subscribe to the feed.

The flow 700 may continue with 734, in which a determination is made regarding whether the customer agrees to satisfy the qualification.

If it is determined that the customer does not agree to satisfy the qualification, the flow may proceed to 780 where the flow ends this instantiation If it is determined that the customer agrees to satisfy the qualification, the flow may proceed to 736, in which the system may facilitate and/or validate the customer's satisfaction of the qualification. For example, for tasks that can be performed on the web, the system may provide the customer with pop ups or links to web resources where the customer may sign up for, view, or otherwise satisfy the qualification. This may include, for example, widgets that use customer information to automatically subscribe the user to a feed designated by the host.

In some examples, the customer's qualification may be validated in 736. For example, it may be confirmed using automated tools whether the customer has recently viewed certain content, e.g. by acquiring passcodes or keys available via the content, and other methods known in the art.

Returning to 730, if it is determined that the customer is qualified, or if the customer becomes qualified in 736, the flow 700 may continue with 740, in which a redemption request from the customer may be validated, as described previously herein. For example, the redemption request may be compared to any number of redemption parameters set by the host, or the service provider, in order to determine if the customer is eligible for the item, and/or if the customer is a winner of the item.

The flow 700 may continue with 750, in which a determination is made regarding whether the customer is a winner, i.e. is entitled to claim the giveaway item. This determination may be based on, for example, algorithms incorporating one or more redemption parameters, etc.

If it is determined that the customer is not a winner, the flow may proceed to 780 (after any suitable advisement regarding when the customer will be eligible to resubmit a redemption request, etc.) where the flow ends this instantiation.

If it is determined that the customer is a winner, the flow may proceed to 760, in which the customer may be allowed to redeem or claim the item. In some examples, the customer may be required to provide additional information and/or make certain other agreements in order to redeem the item. In some examples, however, all of the necessary information and agreements will already have been addressed such that the customer can seamlessly redeem the item in 760 without further requirements. As discussed previously, some examples may provide for the required number of items for the giveaway being pre-paid and reserved in inventory such that the customer is guaranteed to a very reliable degree, swift satisfaction of the claimed item once he or she is determined to be a winner.

According to certain examples such as those discussed above, processes for users creating and promoting giveaways can be streamlined significantly. For example, each host's giveaway site may receive a unique URL for their own giveaway page on the electronic marketplace. Thus, promoting the giveaway may be simplified, as discussed further herein. For example, hosts can share their giveaway URLs wherever they please (e.g., Twitter, Facebook, email). In some examples, eligible giveaway participants who visit the giveaway URL may be allowed to simply click "Enter" and immediately discover if they're a winner. Prizes may be shipped to winners' shipping addresses stored in a customer profile, or, in the case of digital prizes, may be immediately added to their accounts.

In some examples, systems may be configured to publish names of winners at the end of a giveaway, in compliance with applicable sweepstakes laws. However, systems may also be configured to provide data to hosts that are aggregated and anonymous (e.g., 114 people participated). In some examples, systems may be configured not to share shipping addresses with hosts, which can also encourage greater participation.

In some examples, a threshold, such as participants that win over $250 or other statutory amount in prizes in a given year, may be used to prompt the service provider to require a Tax Identification Number from the participant. However, systems may be configured to prevent such Tax Identification Numbers, and other personal identification, from being shared with hosts.

Figure 8:
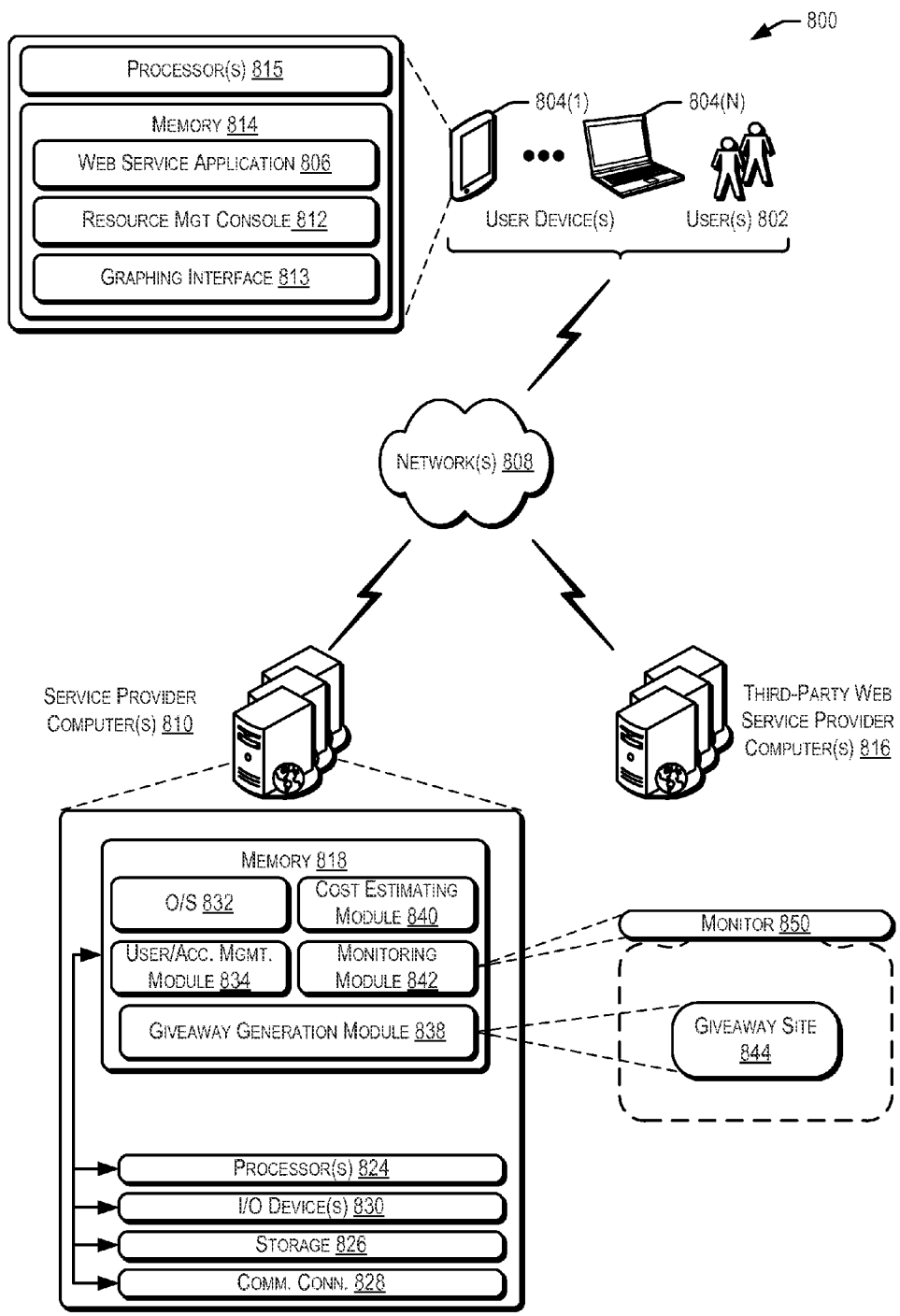
FIG. 8 illustrates another example architecture for implementing the order and redemption techniques described herein, according to at least one example.

FIG. 8 depicts another illustrative system or architecture 800 in which techniques for supporting giveaways in an electronic marketplace may be implemented. In architecture 800, one or more customers and/or users 802 (e.g., account holders of an electronic marketplace service) may utilize user computing devices 204(1)-(N) (collectively, "user devices 804") to access a network browser 806 (e.g., a web browser), via one or more networks 808. In some aspects, the web browser 806 may provide network content that may be hosted, managed and/or otherwise provided by a service provider, such as by utilizing one or more service provider computers 802. In some examples, a customer may own, manage, operate, control, or otherwise be responsible (e.g., financially) for one or more accounts, groups of accounts, and/or sub-groups of accounts. The one or more service provider computers 802 may, in some examples, provide computing resources such as, but not limited, web hosting, client entities, data storage, data access, management, virtualization, etc.

In some aspects, a processing entity may be virtual and/or data volumes may be stored virtually within a distributed computing system operated by the one or more service provider computers 802. The one or more service provider computers 802 may also be operable to provide web hosting, computer application development, and/or implementation platforms, combinations of the foregoing, or the like to the one or more users 802. Additionally, in some examples, the one or more service provider computers 802 may be associated with or otherwise utilized to manage a service provider (e.g., a company or other business entity) that provides an electronic marketplace of digital and/or physical items. The service provider may also manage a fulfillment center (e.g., a warehouse that stores physical items that may be capable of fulfilling orders for the items by shipping the items or scheduling shipment of the items) and/or a brick-and-mortar store.

In some examples, the networks 808 may include any one or a combination of many different types of networks, such as cable networks, the Internet, wireless networks, cellular networks and other private and/or public networks. While the illustrated example represents the users 802 accessing the web service application 806 over the networks 808, the described techniques may equally apply in instances where the users 802 interact with the service provider computers 802 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the web browser 806 may allow the users 802 to interact with a service provider computers 802, such as to view, review, rate, order and/or purchase items and/or other content, as well as apply such items to a giveaway as further discussed herein. The one or more service provider computers 802, perhaps arranged in a cluster of servers or as a server farm, may host the content displayed by the web browser 806. Other server architectures may also be used to host the web browser 806. The web browser 806 may be capable of handling requests from many users 802 and serving, in response, various user interfaces that can be rendered at the user devices 804 such as, but not limited to an electronic catalog of items offered or otherwise provided (e.g., in advertisements or the like) by an electronic marketplace. The web browser 806 can display any type of website that supports user interaction, including social networking sites, online retailers, informational sites, blog sites, search engine sites, news and entertainment sites, and so forth. As discussed above, the described techniques can similarly be implemented outside of the web browser 806, such as with other applications running on the user devices 804.

As noted above, the architecture 800 may include one or more user devices 804. The user devices 804 may be any type of computing device such as, but not limited to, a mobile phone, a smart phone, a personal digital assistant (PDA), a laptop computer, a desktop computer, a thin-client device, a tablet PC, etc. In some examples, the user devices 804 may be in communication with the service provider computers 810 via the networks 808, or via other network connections.

In one illustrative configuration, the user devices 804 may include at least one memory 814 and one or more processing units (or processor(s)) 215. The processor(s) 815 may be implemented as appropriate in hardware, computer-executable instructions, firmware, or combinations thereof. Computer-executable instruction or firmware implementations of the processor(s) 815 may include computer-executable or machine-executable instructions written in any suitable programming language to perform the various functions described herein.

The memory 814 may store program instructions that are loadable and executable on the processor(s) 815, as well as data generated during the execution of these programs. Depending on the configuration and type of user device 804, the memory 814 may be volatile (such as random access memory (RAM)) and/or non-volatile (such as read-only memory (ROM), flash memory, etc.). The user device 804 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 814 may include multiple different types of memory, such as static random access memory (SRAM), dynamic random access memory (DRAM), or ROM.

Turning to the contents of the memory 814 in more detail, the memory 814 may include an operating system and one or more application programs or services for implementing the features disclosed herein including at least the web browser 806. Additionally, the memory 814 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 804.

In some examples, the service provider computers 802 may also be any type of computing devices such as, but not limited to, mobile, desktop, thin-client and/or cloud computing devices, such as servers. In some examples, the service provider computers 802 may be in communication with the user devices 804 and/or the third-party service provider computers 816 via the networks 808, or via other network connections. The service provider computers 802 may include one or more servers, perhaps arranged in a cluster, as a server farm, or as individual servers not associated with one another. These servers may be configured to host a website (or combination of websites) viewable via the user devices 804 or the web browser 806 accessible by a user 802. Additionally, in some aspects, the service provider computers 802 may be configured to perform the various giveaway support functions described herein as part of an integrated, distributed computing environment.

In one illustrative configuration, the service provider computers 802 may include at least one memory 818 and one or more processing units (or processor(s)) 824. The processor(s) 824 may be implemented as appropriate in hardware, computer-executable instructions, firmware, or combinations thereof. Computer-executable instruction or firmware implementations of the processor(s) 824 may include computer-executable or machine-executable instructions written in any suitable programming language to perform the various functions described.

The memory 818 may store program instructions that are loadable and executable on the processor(s) 824, as well as data generated during the execution of these programs. Depending on the configuration and type of service provider computers 802, the memory 818 may be volatile (such as random access memory (RAM)) and/or non-volatile (such as read-only memory (ROM), flash memory, etc.). The service provider computers 802 or servers may also include additional storage 826, which may include removable storage and/or non-removable storage. The additional storage 826 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 818 may include multiple different types of memory, such as static random access memory (SRAM), dynamic random access memory (DRAM), or ROM.

The memory 818, the additional storage 826, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 818 and the additional storage 826 are all examples of computer storage media. Additionally, the memory 818 and other envisioned memory devices of the service provider computers 802 are intended to cover systems where the different memory devices may be distributed among multiple computing systems. For example, the memory 818 may be implemented by a first device of the service provider computers 802 (e.g., service provider computer 802(1)), while other memory devices may be implemented by a second (and different) device of the service provider computers 802 (e.g., service provider computers 802(2)). Further, one or more different modules and/or sets of modules may be implemented by different hosts, in some examples, even located in different locations and/or on different racks. For example, one or more application programs or services implemented by the service provider computers 802 may each be implemented by different host computing devices, or the like.

The service provider computers 802 may also contain communications connection(s) 828 that allow the service provider computers 802 to communicate with a stored database, another computing device or server, user terminals and/or other devices on the networks 808. The service provider computers 802 may also include input/output (I/O) device(s) 830, such as a keyboard, a mouse, a pen, a voice input device, a touch input device, a display, speakers, a printer, etc.

Turning to the contents of the memory 818 in more detail, the memory 818 may include an operating system 832 and the one or more application programs or services for implementing the features disclosed herein including a user application/account management module 834, a giveaway generation module 838 and/or cost estimating module 840.

The user application/account management module 834 may be configured to generate, host, or otherwise provide a website for accessing the service provider computers 802 and/or the electronic marketplace. In some examples, the user application/account management module 834 may also be configured to maintain, or otherwise store, account information associated with requested network content. The account information may include account holder information, the user ID, the password, acceptable answers to challenge questions, etc. Additionally, as noted above, each of the aforementioned modules 832, 834, 838, 840 may be implemented or otherwise provided by different computing devices of the service provider computers 802. For example, while the giveaway generation module 838 and the cost estimating module 840 are illustrated in FIG. 8 as being stored within the memory 818 and, potentially hosted by a single computing device, it will be understood that these modules 838, 840 (and/or any of the other modules in the memory 818) may be stored or implemented by one or more different devices of the service provider computers 802 (e.g., in a distributed environment).

In some aspects, the giveaway generation module 838 may be configured to generate one or more giveaway sites, such as giveaway site 844, or widgets embedded in an existing site, based on a user request and parameters set by the user.

In some examples, the cost estimating module 840 may be configured to estimate any of the costs discussed herein such as, for example, shipping costs, taxes, etc. The cost estimating module 840 may be further configured to calculate refunds based on actual costs compared to the estimated costs charged to the user.

In some examples, a monitor 850 may be established to track (e.g. in substantially real time) the redemption of individual items via the giveaway site 844. These transactions may be communicated to a monitoring module 842 included in the service provider computers 810, which may be configured to encumber inventory, unencumber inventory, and/or direct validated claims to appropriate fulfillment centers. The monitor 850 and/or monitoring module 842 may be further configured to detect suspicious or malicious activity associated with giveaway sites or widgets such as giveaway site 844.

Monitoring module 842 and/or user account management module 834 may include systems, specialized algorithms and/or and machine learning systems to identify and block bulk creation of fake customer accounts, e.g. by tracking browser/device fingerprints and buying velocity. Thus, the ability of individuals to enter giveaways multiple times may be curtailed.

Additional types of computer storage media that may be present in the service provider computers 802 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 802. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 9:
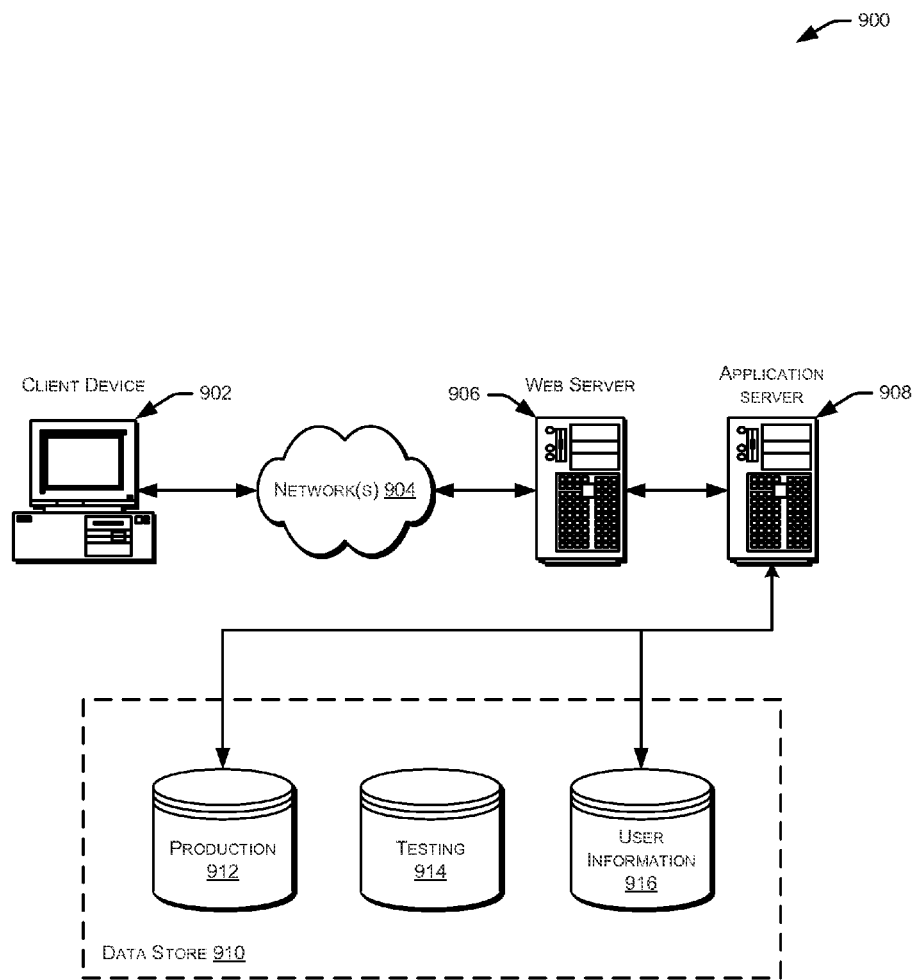
FIG. 9 illustrates another example architecture for implementing the order and redemption techniques described herein, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or machine as discussed elsewhere herein.

The data store 910 can include several separate data tables, databases or other data storage mechanisms and media for storing data relating to a particular aspect. For example, the data store illustrated includes mechanisms for storing production data 912 and user information 716, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
   a memory that stores computer-executable instructions; and
   a processor configured to access the memory, the processor configured to access the memory and execute the computer-executable instructions to collectively at least:
      provide a website that provides an electronic marketplace;
      receive, via the website that provides the electronic marketplace, an order from a user device operated by a first user, the order including an item identifier for an item offered by the electronic marketplace and a desired quantity;
      receive a redemption parameter from the first user;
      charge the first user based at least in part on a cost of the item and the desired quantity;
      at least in response to a bill sent to the first user, encumber a number of the items in an inventory of the electronic marketplace based at least in part on the desired quantity;
      identify that a second user has accessed the website;
      transmit a security key to the second user based at least in part on the identified access;
      receive a redemption request for the item and the security key from the second user;
      validate the redemption request based at least in part on the redemption parameter and the security key;
      reduce a quantity of the items available for redemption based at least in part on the validating of the redemption request; and
      initiate delivery of one of the encumbered items to the second user.

2. The system of claim 1, wherein the inventory of the electronic marketplace is maintained at least partially in a plurality of fulfillment centers, and the processor is further configured to identify a designated fulfillment center for the validated redemption request, and to initiate delivery of the one of the items from the designated fulfillment center to the second user.

3. The system of claim 1, wherein the processor is further configured to provide network link information to the first user, the network link information configured for directing the redemption request.

4. The system of claim 1, wherein the redemption parameter includes at least one of a start time, an end time, a frequency, a geographical area, an age, an enrollment requirement, or a disqualifying feature.

5. The system of claim 1, wherein the processor is further configured to provide a demand forecast associated with the item, the demand forecast based at least partially on a sales record for the number of the items, and wherein sales based on the order are included in the sales record for the number of the items only after at least one of the redemption requests for the order is validated.

6. The system of claim 5, wherein the sales based on the order are updated in the sales record for the number of the items after each redemption request for the order is validated.

7. The system of claim 1, wherein the processor is further configured to calculate a refund due to the first user based at least in part on at least one of:
a difference between an estimated shipping cost and an actual shipping cost;
a difference between an estimated tax and an actual tax; or
a purchase price of any of the items that were charged to the first user but not redeemed by the second user.

8. The system of claim 1, wherein validating the redemption request from the second user is based at least in part on user profile information associated with the second user and that is maintained by a provider of the electronic marketplace.

9. The system of claim 1, wherein the desired quantity is limited at least in part by the number of the items in the inventory of the electronic marketplace.

10. The system of claim 1, the processor further configured to:
receive a shipping parameter from the first user, wherein the shipping parameter includes a preferred shipping type;
determine whether to ship the item to the second user using the preferred shipping type; and
calculate a refund due to the first user based at least in part on differences between the preferred shipping type and an actual shipping type used to ship the item to the second user.

11. A system, comprising:
a memory that stores computer-executable instructions; and
a processor configured to access the memory, the processor configured to access the memory and execute the computer-executable instructions to collectively at least:
provide a website that provides an electronic marketplace;
reserve, via the website that provides the electronic marketplace, one or more paid-for items in an inventory of the electronic marketplace, a cost for the one or more paid-for items having been charged to a user device operated by a first user;
identify that a second user has accessed the website;
transmit a security key to the second user based at least in part on the identified access;
receive a redemption request for one of the reserved paid-for items and the security key from the second user;
validate the identity of the second user based at least in part on user profile information that is at least one of maintained or created by a provider of the electronic marketplace;
validate the redemption request based at least in part on the validation of the identity of the second user and the security key;
reduce a quantity of the reserved paid-for items available for redemption based at least in part on the validating of the redemption request;
initiate delivery of one of the reserved paid-for items to the second user; and
report the redemption of the one of the reserved paid-for items to a third party based at least in part on a first threshold.

12. The system of claim 11, wherein validating the identity of the second user includes verifying that the second user has at least one of a unique identifier, or a combination of identifying information, that is different than that included in any other user profile maintained by the provider of the electronic marketplace.

13. The system of claim 11, wherein reporting the redemption of the one of the reserved paid-for items to the third party includes reporting a value of the one of the reserved paid-for items and identifying information for the second user.

14. A computer-implemented method, comprising:
providing a website that provides an electronic marketplace;
receiving, via the website that provides the electronic marketplace, an order from a user device operated by a first user, the order including an item identifier for an item offered by the electronic marketplace and a desired quantity;
receiving a redemption parameter from the first user;
charging the first user based at least in part on a cost of the item and the desired quantity;
at least in response to a bill sent to the first user, encumbering a number of the items in an inventory of the electronic marketplace based at least in part on the desired quantity;
identifying that a second user has accessed the website;
transmitting a security key to the second user based at least in part on the identified access;
receiving a redemption request for the item and the security key from the second user;
validating the redemption request based at least in part on the redemption parameter and the security key;
reducing a quantity of the items available for redemption based at least in part on the validating of the redemption request; and
initiating delivery of one of the encumbered items to the second user.

15. A non-transitory computer-readable storage device storing computer-executable instructions that, when executed by one or more computer systems, configure the one or more computer systems to perform operations comprising:

providing a website that provides an electronic marketplace;

receiving, via the website that provides the electronic marketplace, an order from a user device operated by a first user, the order including an item identifier for an item offered by the electronic marketplace and a desired quantity;

receiving a redemption parameter from the first user;

charging the first user based at least in part on a cost of the item and the desired quantity;

at least in response to a bill sent to the first user, encumbering a number of the items in an inventory of the electronic marketplace based at least in part on the desired quantity;

identifying that a second user has accessed the website;

transmitting a security key to the second user based at least in part on the identified access;

receiving a redemption request for the item and the security key from the second user;

validating the redemption request based at least in part on the redemption parameter and the security key;

reducing a quantity of the items available for redemption based at least in part on the validating of the redemption request; and initiating delivery of one of the encumbered items to the second user.

* * * * *